United States Patent [19]

Fenner

[11] 4,144,010

[45] Mar. 13, 1979

[54] METHOD OF AND APPARATUS FOR INJECTION MOLDING OF INJECTION MOLDED PARTS CONTAINING IMBEDDED INSERTS

[75] Inventor: Werner Fenner, Schneisingen, Switzerland

[73] Assignee: Bucher-Guyer AG, Maschinenfabrik, Niederweningen, Switzerland

[21] Appl. No.: 793,057

[22] Filed: May 2, 1977

[51] Int. Cl.² ............................................... B29F 1/00
[52] U.S. Cl. ............................... 425/125; 425/126 R; 425/129 R; 425/574; 425/576
[58] Field of Search ............... 425/126 R, 129 R, 117, 425/125, 574, 575, 576

[56] References Cited

U.S. PATENT DOCUMENTS

| 3,568,247 | 3/1971 | Lunn | 425/129 |
|---|---|---|---|
| 3,900,278 | 8/1975 | Beck | 425/126 R X |
| 3,973,888 | 8/1974 | Hehl | 425/126 R |

FOREIGN PATENT DOCUMENTS 2228168  12/1972  Fed. Rep. of Germany ........... 425/574

*Primary Examiner*—William R. Briggs
*Attorney, Agent, or Firm*—Werner W. Kleeman

[57] ABSTRACT

A method of and apparatus for injection molding of injection molded parts containing imbedded inserts, especially injection molded parts formed of a thermosetting plastic, comprising an injection molding machine equipped with an injection nozzle located at an injection molding position and a divided injection mold having hollow mold compartments or cavities. The injection mold is operatively connected with the injection nozzle and one of the cooperating mold halves is connected with a stationary mold support plate and the other mold half with a movable mold support plate displaceable towards and away from the stationary mold support plate. At an insert element-filling position removed from the injection molding position there is provided means for delivering and introducing the insert elements into the hollow mold compartments. According to the invention, at least two similar mold halves are arranged upon one mold support plate, each of these mold halves is alternately shiftable, transverse to the direction of movement of the movable mold support plate, from a first position, corresponding to the injection molding position, where it is located opposite the other cooperating mold half into a second position, corresponding to the insert element-filling position, where it is located opposite the means for delivering and introducing the insert elements into the hollow mold compartments.

3 Claims, 3 Drawing Figures

METHOD OF AND APPARATUS FOR INJECTION MOLDING OF INJECTION MOLDED PARTS CONTAINING IMBEDDED INSERTS

BACKGROUND OF THE INVENTION

The present invention broadly relates to the art of injection molding of injection molded parts containing insert elements molded therein, especially injection molded parts formed of a thermosetting plastic or duroplast, and specifically pertains to a new and improved method of, and apparatus for, injection molding of such injection molded parts.

Examples of such injection molded parts are mass produced parts formed of electrically insulating thermosetting plastics containing imbedded or cast therein metallic threaded bushings or sleeves, such as for instance components of sockets, plugs and the like, or, however, parts of plastic housings in which, for instance, there are cast metallic threaded bushings, centering pins and sleeves.

In the art of injection molding of plastics there has already been employed the so-called "cassette or cartridge principle". This principle strives to simplify the introduction of the insert elements, about which there is cast the plastic material, into the hollow mold compartments. This technique contemplates utilizing a reusable templete or stencil, namely the "cassette" or cartridge" which retains the insert elements in a desired number and relative position, and introducing such "cassette", with the injection mold open, in front of the hollow mold compartments. Thereafter, by causing the closure unit to carry out a predestined work stroke the insert elements are ejected out of the cassette and displaced into the hollow mold compartments, whereupon the injection mold provided with the insert elements is ready for a new injection mold cycle. With the heretofore known equipment, working with this principle, the introduction of the insert elements requires a considerable amount of time which is not negligible, considerably reducing the production capacity of the injection molding machine in comparison to injection molding machines which injection mold parts without insert elements. In reality the mode of operation of the heretofore known apparatuses — starting from the open and empty injection mold — can be considered as encompassing the following procedures:

1. Bringing a cassette equipped with insert elements in front of the one mold half of the injection mold.
2. Closing the injection mold and thereafter simultaneously injecting the insert elements out of the cassette and transferring such insert elements into the hollow mold compartments.
3. Opening the injection mold and removing the now emptied cassette.
4. Closing the injection mold, thereafter injecting the plastic into the hollow mold compartments and then setting or hardening the injection molded parts.
5. Opening the injection mold and ejecting the injection molded parts out of the injection mold so that the latter is again empty.

Hence, it will be recognized when injection molding injection molded parts which do not contain therein cast insert elements, it is only necessary to perform the aforementioned steps 4 and 5, whereas, on the other hand, with the known apparatuses the steps 1 to 3 constitute a significant unproductive expenditure in time.

SUMMARY OF THE INVENTION

Hence, with the foregoing in mind, it is a general object of the present invention to provide an improved method of, and apparatus for, injection molding of injection molded parts containing imbedded inserts, in a manner not associated with the aforementioned drawbacks and limitations of the prior art proposals.

Another and more specific object of the present invention aims at the provision of an apparatus, which while retaining the advantages of the so-called "cassette or cartridge principle", renders possible a considerable increase in the production capacity.

Yet a further important object of the present invention aims at the provision of a novel method for the injection molding of injection molded parts containing imbedded inserts which affords increased production capacity for the injection molding machine by filling inserts into a mold half held in readiness at an insert filling position remote from the injection molding position where another similar mold half, previously filled with inserts, of an injection mold is in its closed position and in the process of undergoing the injection molding operation.

Still a further significant object of the present invention aims at a new and improved method of, and apparatus for, injection molding of injection molded parts containing imbedded inserts utilizing an arrangement wherein one mold half is filled with inserts while another mold half of the closed injection mold is being filled with the plastic material at the injection molding station or position.

Another object of the present invention aims at an injection molding technique relying upon filling of a mold half with inserts at a location remote from the location where the injection molding operation occurs, to thereby continually maintain in readiness an insert filled-mold half for the next injection molding cycle, thereby increasing the production capacity of the equipment inasmuch as the filling time for the inserts can be accomplished at least during part of the time that an injection mold containing a mold half previously filled with inserts is being injection molded with plastic material.

Now in order to implement these and still further objects of the invention, which will become more readily apparent as the description proceeds, the invention proposes an apparatus containing an injection molding machine equipped with an injection nozzle and with a divided injection mold possessing hollow mold compartments or cavities. The injection mold is operatively connected with the injection nozzle and the cooperating mold halves thereof have one mold half connected with a stationary mold support plate and the other mold half with a movable mold support plate which is displaceable towards and away from the stationary mold support plate. Further, means deliver and introduce the insert elements into the hollow mold compartments. According to significant aspects of the invention, at least two similar mold halves are arranged at the one mold support plate, each of these mold halves can be moved, substantially transverse to the direction of movement of the movable mold support plate, alternately from a first position, where it is located opposite the other cooperating mold half, into a second position where it is located opposite the means for the delivery and introduction of the insert elements into the mold hollow compartments.

As already alluded to above, the invention is also concerned with a novel method of injection molding injection molded parts provided with insert elements imbedded therein, especially injection molded parts formed of a thermosetting plastic, which contemplates displacing in succession a plurality of insert element-holders, typically cartridges, each containing insert elements, into a position where one of the insert element-holders is located in substantially aligned confronting relationship with a mold half containing mold compartments for receiving the insert elements; then closing an injection mold containing a further mold half similar to the first mentioned mold half located opposite the insert element-holder, and which further mold half has had its mold compartments previously filled with insert elements. Plastic material is injection molded into the closed injection mold at an injection molding position which is located remote from the mold half ready to be filled with the insert elements and which is located at an insert element-filling position. During the injection molding of the closed injection mold the mold half at the filling position held in readiness to be filled with the insert elements is filled with insert elements contained in the insert element-holder located in confronting relation thereto. After completion of the injection molding of the closed injection mold such mold is opened, the injection molded parts ejected therefrom, the now empty mold half is moved to the filling position, and the filled mold half at the filling position is displaced into the injection molding position and the mold closed. Thereafter such closed injection mold can be filled. The now empty mold half at the filling position can be refilled with insert elements and the operating cycle repeated.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
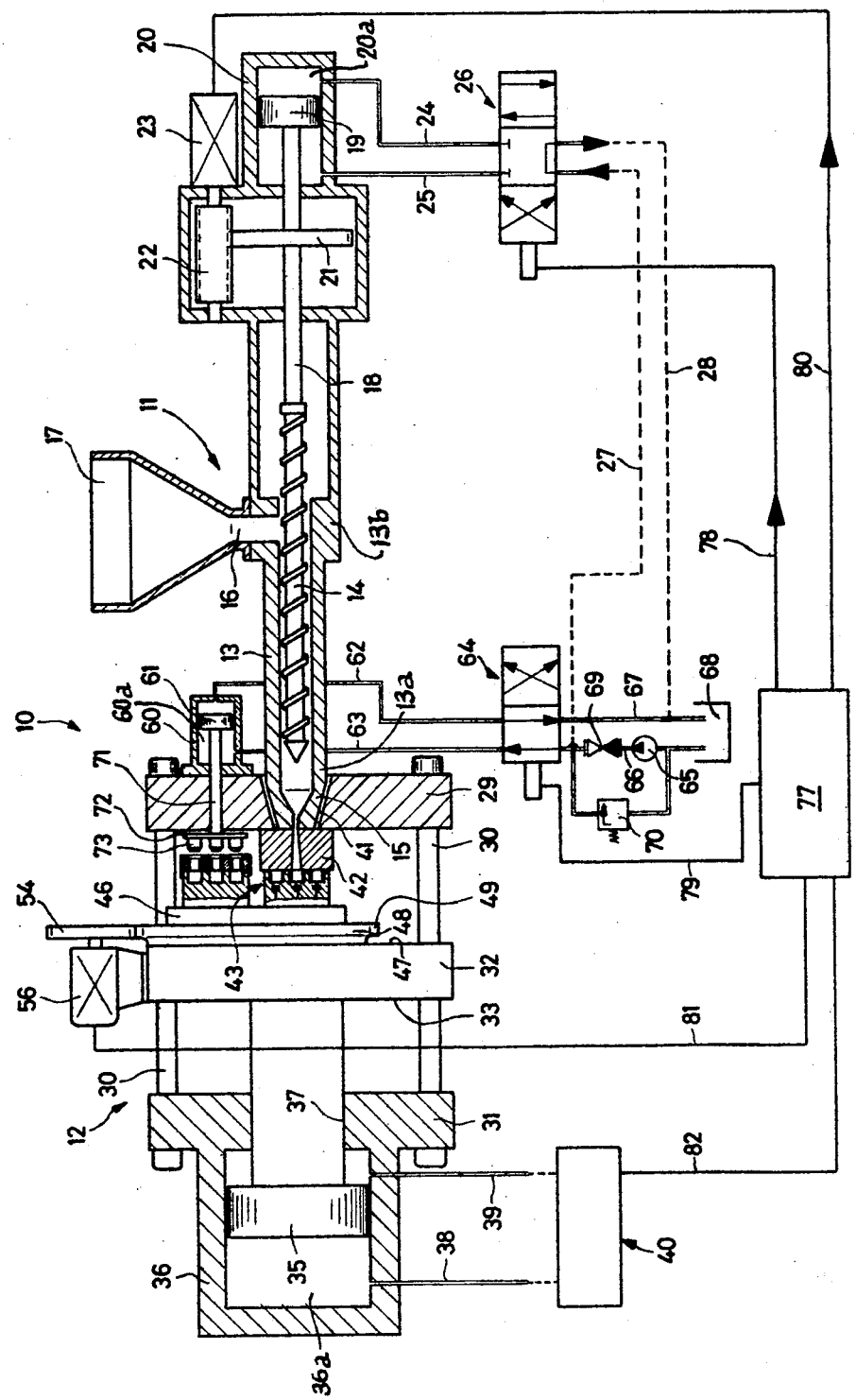
FIG. 1 is a schematic longitudinal sectional view through an injection molding apparatus constructed according to the present invention, while conveniently omitting the machine frame or stand in order to preserve clarity in illustration.

Describing now the drawings, it is to be understood that only enough of the structure of the injection molding machine or apparatus not directly related to the invention will be considered hereinafter and has been illustrated in the drawings as will enable those skilled in the art to readily understand the underlying principles and concepts of the present invention. Hence, the illustrated exemplary construction of injection molding apparatus 10 will be seen to comprise a so-called screw-injection molding machine 11 and a mold closure unit 12 operatively connected therewith. The screw-injection molding machine 11 comprises a screw or worm 14 arranged to be rotatable and axially displaceable in a plasticizing- and injection cylinder 13. At one end 13a of the plasticizing- and injection cylinder 13 there is connected an injection nozzle 15, whereas the other end 13b is connected with the outlet or exit 16 of a filling funnel 17 or equivalent structure for the plastic material which is to be injection molded. The screw 14 is attached to the piston rod 18 of a pressure piston 19 which, in turn, is displaceably and rotatably mounted in a hydraulic cylinder 20.

Continuing, it will be seen that a gear 21 is seated upon the piston rod 18, this gear 21 is in continuous meshing engagement with a toothed drum or barrel 22, which, in turn, is driven by means of a suitable drive motor 23 during the refilling of the cylinder 13 with the plastic material or molding compound to be injection molded, i.e. during the plasticizing thereof. The internal compartment or chamber 20a of the hydraulic cylinder 20 is connected to both sides or faces of the piston 19, by means of a respective pressure line or conduit 24 and 25, with a reversing valve 26 of the type possessing a neutral position, for instance an electromagnetic valve. Connected with the electromagnetic valve 26 is a conventional and therefore only schematically indicated pressure line or conduit 27 and leading from such valve is a likewise conventional and thus schematically indicated return flow conduit or line 28.

At this point attention is directed to the mold closure unit 12 which comprises a stationary mold support or carrier plate 29 which is rigidly connected with a base plate 31 by means of a plurality — in this case four — sturdy cylindrical columns 30. Displaceably mounted upon the columns 30 is a movable mold support or carrier plate 32. This mold support plate 32 is anchored at its rear side or face 33 with the piston rod 34 of a closure piston 35 which, in turn, is displaceably mounted in a hydraulic cylinder 36 which is fixedly anchored at the base plate 31. In the schematic showing of FIG. 1 the cylinder 36 has been portrayed as formed of one-piece with the base plate 31, yet it is to be obviously understood that in practice this cylinder 36 is normally flanged to such base plate 31, so that such separate base plate then forms the closure of the hydraulic cylinder 36 and possesses a bore 37 for piercingly receiving the piston rod 34 (FIG. 2). Leading to both sides or faces of the closure piston 35 and flow communicating with the internal compartment or chamber 36a of the cylinder 36 is a respective pressure line or conduit 38 and 39, which, in turn, emanate from a conventional, reversible and blockable hydraulic unit 40, by means of which the movable mold support plate 32 can be held under pressure in the closed position illustrated in FIG. 1 and thereafter shifted towards the left into the open position.

The stationary mold support plate 29 possesses a throughpassage or passageway 41, through which piercingly extends the injection nozzle 15. Sealingly connected with the injection nozzle 15 is the mold half 42, located at the side where the injection of the plastic material occurs i.e. at the injection molding position, of a divided or bipartite injection mold, generally designated by reference character 43. This one mold half 42 is fixedly anchored with the stationary mold support plate 29. In the closed position of the mold closure unit 12, this mold half 42 closes at the injection molding position one of two associated mold halves 45 (compare also FIG. 2) equipped with hollow mold compartments or cavities 44. In the embodiment under discussion there are provided two such type mold halves 45, which are mounted upon a common intermediate plate 46, which, in turn, is anchored in any suitable fashion by not further illustrated means upon a rotatable table 48 supported at the front side 47 of the movable mold support plate 32. The rotatable table 48 possesses the form of a gear, equipped at its periphery with a gear rim 49 or equivalent structure and rotatably mounted by means of a bearing bushing 51 upon a pivot journal or pin 52 protruding from the front side or face 47 of the movable mold support plate 32. This rotatable table 48 is secured against axial shifting by means of a bolt 53 or the like provided with a retaining or holder disc 50. The toothed rim 49 is in continuous meshing engagement with a pinion 54 seated upon the power take-off shaft 55 of a stepping- or stop motor 56, which may be a hydraulic motor, which, in turn, is mounted at the narrow side of the movable mold support plate 32 and thus is movable along therewith.

Figure 2:
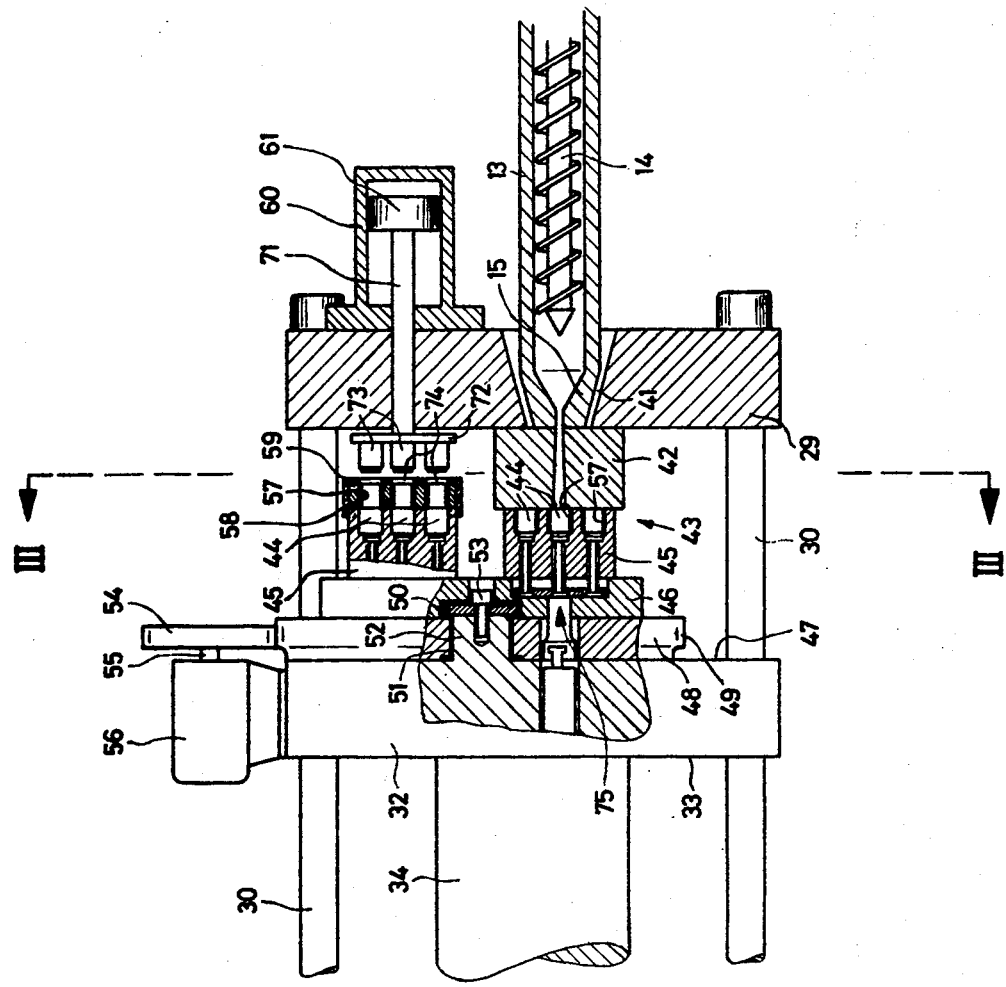
FIG. 2 is an enlarged partial sectional view of part of the apparatus shown in FIG. 1.

It has already been mentioned that in the showing of FIGS. 1 and 2 the mold closure unit 12 is in its closed position and that the mold half 45 located at the bottom of FIGS. 1 and 2 is closed by the mold half 42 at the injection molding position or station. This means that the hollow mold compartments or cavities 44 in this mold half 45 are ready to be injection molded. Hence, the hollow mold compartments 44 of this mold half 45 has also been provided with insert elements or inserts 57, as best seen by referring to FIG. 2.

The other mold half 45 which appears at the top of FIGS. 1 and 2, in the closed position of the mold closure unit 12, bears snugly against an insert element-holder or cassette 58 containing new insert elements 57. This insert element-holder or cassette 58, by shifting the same in a substantially C-shaped rail or track 59 which is open towards the movable support plate 32, is brought into a position which exactly corresponds to the position of the upper mold half 45 i.e. is brought into the so-called insert element-filling position.

At the side of the stationary mold support plate 29 which faces away from the movable mold support plate 32 there is mounted at such mold support plate 29 a double-acting hydraulic cylinder 60 containing a piston 61. To both sides of the piston 61 the inner compartment or chamber 60a of the cylinder 60 is connected with a respective pressure line or conduit 62 and 63, as best seen by referring to FIG. 1, leading to an electromagnetic reversing valve 64. Extending in turn to the electromagnetic reversing valve 64 is a pressure line or conduit 66 which leads away from a hydraulic pump 65 and leading away from the reversing valve 64 is a return flow conduit or line 67. This return flow line 67, like the return flow line 28, leads to a sump or reservoir 68 from which there is also supplied the hydraulic pump 65. It will be seen that pump 65 has arranged in series thereafter a check or non-return valve 69, and such pump 65 and check valve 69 are bridged or by-passed by an excess pressure valve 70 which opens in the direction of the sump or reservoir 68. At this point it is of course worthy of mention that the check or non-return valve 69 may be omitted.

At the piston 61 there is secured a piston rod 71 which piercingly extends through the stationary mold support plate 29 and at the end of which there is provided a punch 72. The punch 72 possesses a number of punch pins or plungers 73 which in their arrangement and number correspond exactly to the insert elements 57 which are to be inserted or introduced into the hollow mold compartments or cavities 44. With the exemplary embodiment of FIG. 3 it has been assumed that there are introduced nine such insert elements 57 by way of example.

Now if the valve 64 is shifted from the position shown in FIG. 1, then the piston 61 is caused to perform a work stroke, so that the punch 72 is forwardly displaced. Consequently, the punch pins 73 penetrate through appropriate openings 74 (FIG. 2) formed in the floor of the rail 59 and thus eject the insert elements or inserts 57 out of the cassette or insert element-holder 58, which bears snugly against the upper mold half 45, and thereby press such inserts 57 into the hollow mold compartments 44. Now the valve 64 can be again reversed, so that the piston 61 is retracted and along therewith the punch 72.

During such time as these operations have taken place at the upper mold half 45 located at the insert filling position, it will be apparent that the screw 14 carries out an injection stroke, and thus, the hollow mold compartments 44 together with the insert elements 57 in the lower mold half 45 at the injection molding location have molded therein the injection molding material or compound.

Figure 3:
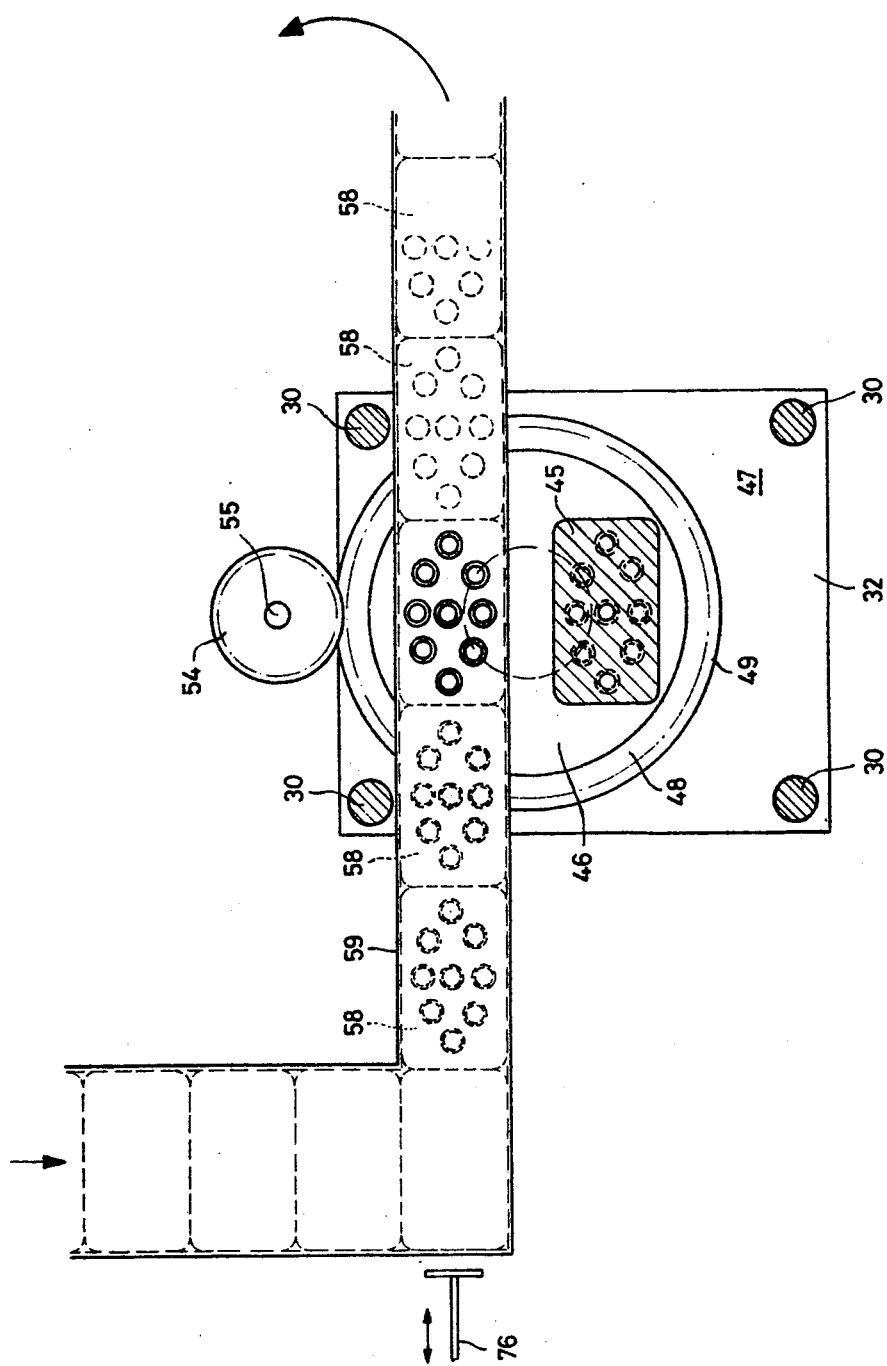
FIG. 3 is a schematic sectional view, taken substantially along the line III—III of FIG. 2.

Now the mold closure unit 12 is brought into its open position, whereupon, on the one hand, the injection molded parts which have been fabricated are ejected in conventional manner by means of an ejector mechanism 75, and, on the other hand, with the aid of a feed plunger 76, which has only been schematically shown in FIG. 3, a new insert element-holder or cassette 58 provided with the insert elements 57 is shifted in the rail 59 into the desired filling position. Thereupon, the drive motor 56 also is turned-on for such length of time until the rotatable table 48 has carried out a rotation or table indexing through 180°.

Now the mold closure unit 12 is again closed and thereafter both the punch 72 as well as also the screw 14 simultaneously carry out a new work- and injection stroke, respectively.

It will be therefore seen that the described apparatus practically can get by with the same steps as an apparatus for injection molding of injection molded parts without insert elements. There is only additionally required the rotation or indexing of the rotatable table 48, which, however, can be accomplished at least partially during the closing stroke of the closure unit 12.

From the foregoing description of the mode of operation of the exemplary embodiment of apparatus the construction and operation of the electrical sequence control mechanism 77 will be readily apparent, which controls by means of the control lines 78, 79, 80, 81 and 82 the valves 26, 64 and the motors 23, 56 and hydraulic unit 40 respectively. It should be equally recognized that with a relatively small expenditure in additional equipment it is possible to convert an existing injection molding machine into the described apparatus construction, because such modified machine, in principle, only is augmented by the rotatable table 48 with its associated drive, the holder-guide rail 59 and the ejector punch 72 (which also can be mechanically driven). Finally, it is indicated by way of completeness that a conventional sensor, such as an optical sensor, can be utilized for the purpose of checking whether the insert element-holders or cartridges have been loaded with the inserts or parts intended to be inserted into the mold.

While there are shown and described present preferred embodiments of the invention, it is to be distinctly understood that the invention is not limited thereto, but may be otherwise variously embodied and practiced within the scope of the following claims. Accordingly,

I claim:

1. An apparatus for injection molding injection molded parts provided with insert elements imbedded therein, especially injection molded parts formed of a thermosetting plastic, comprising:
   a stationary mold support plate;
   a movable support plate;
   means connected to said movable support plate for moving the same toward and away from said stationary mold support plate;
   a first mold half mounted on said stationary mold support plate;
   an injection nozzle operatively connected to said first mold half;
   a support table;
   means for rotatably mounting said support table on said movable support plate;
   a pair of second mold halves mounted on said support table substantially diametrically opposite to each other relative to said mounting means;
   a plurality of mold cavities in each second mold half, the mold cavities of each second mold half being arranged in substantially the same pattern;
   means mounted between said stationary mold support plate and said support table for delivering and introducing insert elements into the mold cavities of a respective second mold half;
   means operatively connected to said support table for rotating said support table stepwise through 180° about said mounting means such that one of said second mold halves confronts said first mold half and the other second mold half confronts said delivering and introducing means;
   said delivering and introducing means comprising a plurality of insert element holders, each of which includes means for releasably holding a plurality of insert elements in a pattern corresponding to the pattern of the mold cavities of said second mold halves, means for guiding and positioning said insert element holders sequentially in confronting relation with said other second mold half, reciprocating ram means mounted on said stationary mold support plate for simultaneously removing the insert elements from the insert element holder confronting said other second mold half and for transferring such insert elements into respective mold cavities of said other second mold half; and
   control means operatively connected to said support plate moving means, injection nozzle, ram means and support table rotating means for simultaneously operating said injection nozzle and ram means when said movable support plate is moved toward said stationary mold support plate and for operating said support table rotating means when said movable support plate is moved away from said stationary mold support plate.

2. Apparatus according to claim 1, wherein said insert element holder guiding and positioning means comprises a rail arranged transversely across said support table between said support plates and plunger means for feeding said holders along said rail.

3. Apparatus according to claim 1, wherein said means for moving the movable support plate and said ram means are movable along axes parallel with the axis of the injection nozzle.

* * * * *